(12) United States Patent
Zborovsky et al.

(10) Patent No.: US 7,870,738 B2
(45) Date of Patent: Jan. 18, 2011

(54) GAS TURBINE: SEAL BETWEEN ADJACENT CAN ANNULAR COMBUSTORS

(75) Inventors: James M. Zborovsky, Orlando, FL (US); Andreas Heilos, Mülheim an der Ruhr (DE)

(73) Assignee: Siemens Energy, Inc., Orlando, FL (US)

(*) Notice: Subject to any disclaimer, the term of this patent is extended or adjusted under 35 U.S.C. 154(b) by 1235 days.

(21) Appl. No.: 11/540,030

(22) Filed: Sep. 29, 2006

(65) Prior Publication Data
US 2010/0251687 A1  Oct. 7, 2010

(51) Int. Cl.
*F02C 1/00* (2006.01)
*F02G 3/00* (2006.01)
(52) U.S. Cl. .................. 60/752; 277/592
(58) Field of Classification Search .......... 60/39.37, 60/722, 752, 796, 799; 277/592
See application file for complete search history.

(56) References Cited

U.S. PATENT DOCUMENTS

| | | | |
|---|---|---|---|
| 4,628,694 A | 12/1986 | Kelm et al. | |
| 5,172,920 A * | 12/1992 | Schlenk | 277/654 |
| 5,363,643 A | 11/1994 | Halila | |
| 6,162,014 A * | 12/2000 | Bagepalli et al. | 415/170.1 |
| 6,854,738 B2 | 2/2005 | Matsuda et al. | |
| 6,884,384 B2 | 4/2005 | Merrill et al. | |
| 6,895,797 B2 | 5/2005 | Mitchell et al. | |
| 2003/0066292 A1 | 4/2003 | Mack et al. | |
| 2004/0159107 A1 | 8/2004 | Sullivan et al. | |
| 2005/0061004 A1 | 3/2005 | Colibaba-Evulet et al. | |
| 2005/0262844 A1 | 12/2005 | Green et al. | |
| 2005/0262845 A1 | 12/2005 | Martling et al. | |

FOREIGN PATENT DOCUMENTS

| | | |
|---|---|---|
| EP | 0 742 412 A1 | 11/1996 |
| EP | 1 130 219 A1 | 9/2001 |
| EP | 1 143 201 A2 | 10/2001 |
| WO | WO 92/18760 | 10/1992 |
| WO | WO 03/078811 | 9/2003 |

* cited by examiner

*Primary Examiner*—Michael Cuff
*Assistant Examiner*—Andrew Nguyen

(57) ABSTRACT

The present invention is directed to a seal for sealing a gap between transition sections of adjacent can annular combustors in a turbine engine such that the seal is usable in applications for sealing pressure drops of 0.5 bar or greater. The seal includes a plate configured to extend between adjacent transition sections and the plate may have at least one perforation extending from the front surface of the plate to the rear surface of plate. The seal further includes a porous matrix formed from materials capable of withstanding turbine combustion gas temperatures, wherein a portion of the porous matrix may be fixedly attached to a surface of the plate.

18 Claims, 10 Drawing Sheets

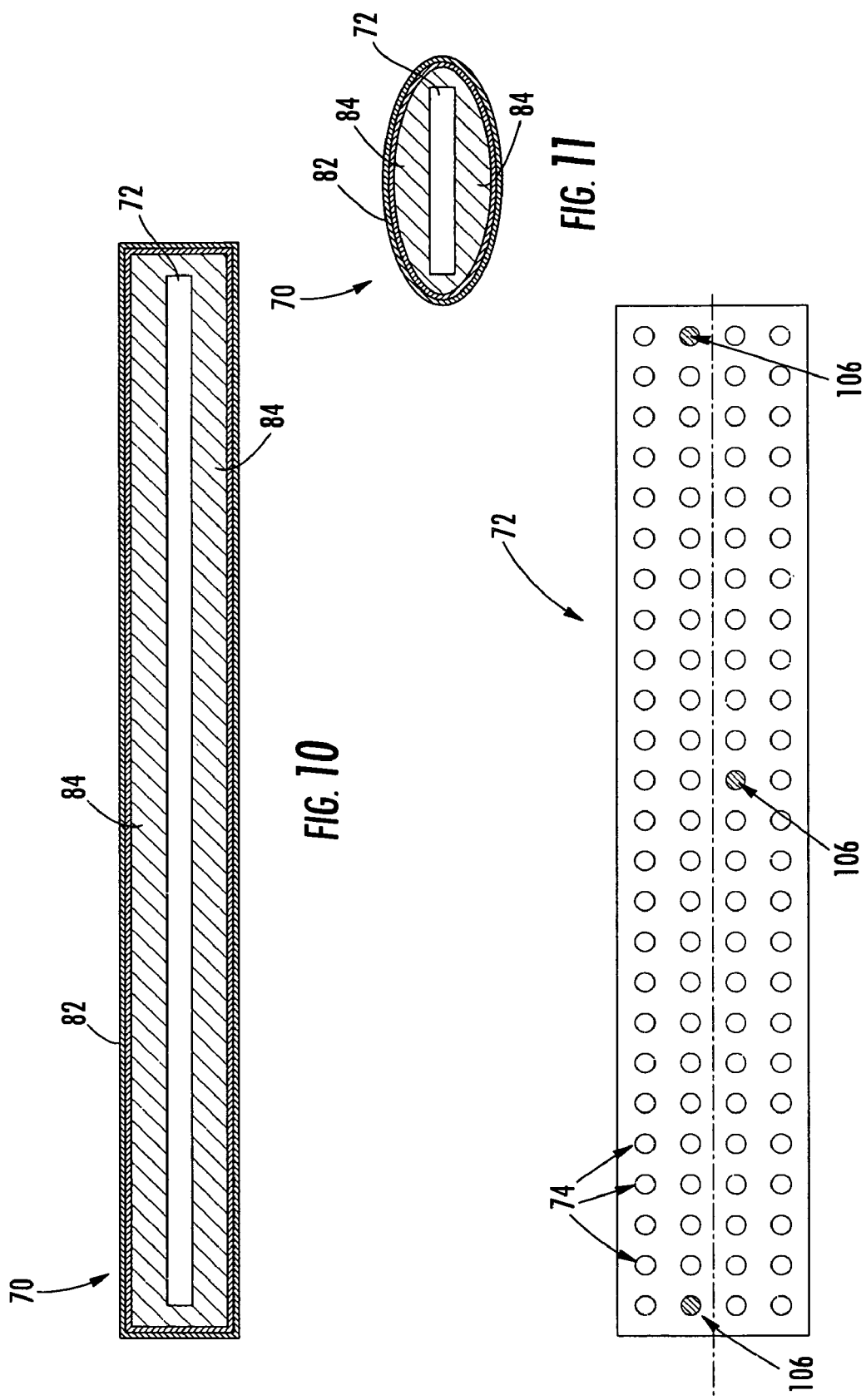

GAS TURBINE: SEAL BETWEEN ADJACENT CAN ANNULAR COMBUSTORS

FIELD OF THE INVENTION

The present invention is directed generally to gas turbine systems, and more particularly to seals between adjacent can annular combustor transition sections in gas turbine systems.

BACKGROUND OF THE INVENTION

As shown in FIG. 1, there is shown a cross-section through a portion of a combustion turbine 10 may include a compressor section 12, a combustion section 14 and a turbine section 16. A rotor assembly 18 is centrally located and extends through the three sections. The compressor section 12 may include cylinders 20, 22 that enclose alternating rows of stationary vanes 24 and rotating blades 26. The stationary vanes 24 may be affixed to the cylinder 20 while the rotating blades 26 may be mounted to the rotor assembly 18 for rotation with the rotor assembly 18.

The combustion section 14 may include a shell 28 that forms a chamber 30. Multiple combustors, for example, sixteen combustors (only one combustor 32 of which is shown) may be contained within the combustion section chamber 30 and distributed around a circle in an annular pattern. Fuel 34, which may be in liquid or gaseous form, such as oil or gas, may enter each combustor 32 and be combined with compressed air introduced into the combustor 32 from the chamber 30, as indicated by the unnumbered arrows surrounding the combustor 32. The combined fuel/air mixture may be burned in the combustor 32 and the resulting hot, combustor exhaust gas flow 36 may be exhausted to a transition section 38 attached to the combustor 32 for routing to the turbine section 16.

The turbine section 16 may include a cylindrical housing 40, including an inner cylinder 42, and may enclose rows of stationary vanes and rotating blades, including vanes 44 and blades 46. The stationary vanes 44 may be affixed to the inner cylinder 42, and the rotating blades 46 may be affixed to discs that form parts of the rotor assembly 18 in the region of the turbine section 16. The first row of vanes 44 and the first row of blades 46 near the entry of the turbine section 16 are generally referred to as the first stage vanes and the first stage blades, respectively.

Encircling the rotor assembly 18 in the turbine section 16 may be a series of vane platforms 48, which together with rotor discs 50, collectively define an inner boundary for a gas flow path 52 through the first stage of the turbine section 16. Each transition section 38 in the combustion section 14 may be mounted to the turbine section housing 40 and the vane platforms 48 to discharge the gas flow 30 towards the first stage vanes 44 and first stage blades 46.

In operation, the compressor section 12 receives air through an intake (not shown) and compresses it. The compressed air enters the chamber 30 in the combustion section 14 and is distributed to each of the combustors 32. In each combustor 32, the fuel 34 and compressed air is mixed and burned. The hot, combustor exhaust gas flow 36 is then routed through the transition section 38 to the turbine section 16. In the turbine section 16, the hot, compressed gas flow is turned by the vanes, such as first stage vane 44, and rotates the blades, such as first stage blade 52, which in turn drive the rotor assembly 18. The gas flow is then exhausted from the turbine section 16. The turbine system 10 may include additional exhaust structure (not shown) downstream of the turbine section 16. The power thus imparted to the rotor assembly 18 may be used not only to rotate the compressor section blades 26 but also to rotate other machinery, such as an external electric generator or a fan for aircraft propulsion (not shown).

Referring now to FIG. 2, three adjacent transition sections 38 are shown as when viewed from axially downstream. Although the transition sections are substantially identical, the transition section 38 located at the 12 o'clock position is used to discuss the relevant parts of each. It should be understood that a turbine engine would have additional transition sections, for example, a total of sixteen, spaced in an annular array.

The transition section 38 may include a transition section body 56 having an inlet 58 for receiving a gas flow exhausted by an associated combustor (not shown, but see FIG. 1). The transition section body 56 may include an internal passage 60 from the inlet 58 to an outlet 62 from which the combustor exhaust gas flow 36 is discharged towards the turbine section (not shown). Surrounding the transition section body 56 is the compression chamber 30, which contains compressed gas that has not yet entered a combustor.

FIG. 3 shows parts of three adjacent transition sections 38 in cross section. Each transition section 38 includes a transition section body 56, an outlet 62, and a combustor exhaust gas flow 36. Surrounding each transition section 38 is the compression chamber 30 containing compressed gas that has yet to enter a combustor (not shown). Downstream of the outlet 62, the combustor exhaust flow 36 enters the turbine entry zone 64, which is the turbine section upstream of the first row of vanes or blades (not shown). In the turbine entry zone 64, the combustor exhaust flow 36 mixes with leaked compressor gas 66 that passed through a gap 68 between adjacent transition sections 38. This leaked compressor gas 66 bypasses the combustors (not shown) and reduces efficiency of the combustion turbine (see FIG. 1). This leakage is driven by the pressure drop between the higher pressure air in the compression chamber 30 and the lower pressure compressor gas in the turbine entry zone 64.

Excess leakage through the gaps between adjacent transitions may prevent a combustion turbine from achieving optimal performance. The power generated by a combustion turbine is, in large part, a function of the initial temperature of the gas expanded through the turbine section. Because the efficiency of a combined cycle turbine process depends on the turbine inlet temperature, the higher the temperature of the gas entering the turbine through the turbine entry zone the more efficient the combined cycle turbine process. The temperature of the gases in the turbine entry zone is referred to as the thermodynamically relevant process temperature.

Compressed air that leaks into the turbine entry zone without passing through the combustors reduces the thermodynamically relevant process temperature because the compressed air is significantly cooler than the combustor exhaust gas flow. Similarly, if all the compressed air in the combustion chamber is fed directly through the combustors, the thermodynamically relevant process temperature would be increased while maintaining a constant combustion temperature. Thus, improved seals for the gap between adjacent transition sections would help improve performance for a combustion turbine.

Controlling or preventing leakage through the gaps between adjacent transition sections is complicated by a number of factors. For instance, differences in thermal expansion cause the size of the gap to change during the operational cycle of the combustion turbine. Another factor is thermal distortion due to temperature gradients that may cause the size of the gap to change along the length of the gap. Another factor is the pressure drop between the compression chamber gases and the turbine entry zone gases, which may typically be 0.5 bar or more. Finally, another factor is the temperature in the gap between adjacent transition sections reaches temperatures ranging from 500° C. to 800° C. during operation of the combustion turbine.

Currently, labyrinth seals and brush seals have been used to limit leakage through the gap between adjacent transition sections. However, labyrinth seals can only achieve limited sealing effectiveness within the available axial space, which is limited by the thickness of the transition section body. In addition, brush seals are comparatively expensive, show limited life, and lead to increased life cycle costs.

Accordingly, a need exists for an improved seal that controls gas leakage across a gap with a high pressure drop, such as the gap between adjacent transition sections that leads from the compression chamber to the turbine entry zone.

SUMMARY OF THE INVENTION

The present invention is directed to a seal for sealing a gap between transition sections of adjacent can annular combustors in a turbine engine such that the seal is usable in applications for sealing pressure drops of 0.5 bar or greater. The seal includes a plate configured to extend between adjacent transition sections. The plate may have one or more perforations extending from the front surface of the plate to the rear surface of the plate. The seal may further include a porous matrix formed from materials capable of withstanding turbine combustion gas temperatures. A portion of the porous matrix may be fixedly attached to a surface of the plate.

In another embodiment, the present invention may include a turbine engine having a plurality of adjacent can annular combustors extending generally axially. Each combustor may have a transition section, wherein a portion of the transition sections are positioned proximate to each other creating radially extending gaps. At least one pair of transition sections includes a radially extending channel in a side surface defining a portion of the radially extending gap between two transition sections. The channels in the transition sections may be generally aligned to create a radially-oriented seal housing. The engine may also include a seal having a plate configured to extend between adjacent transition sections. The plate may have one or more perforations extending from a front surface of the plate to a rear surface of the plate. The seal may also include a porous matrix formed from materials capable of withstanding turbine combustion gas temperatures. A portion of the porous matrix may be fixedly attached to a surface of the plate.

These and other embodiments are described in more detail below.

BRIEF DESCRIPTION OF THE DRAWINGS

The accompanying drawings, which are incorporated in and form a part of the specification: illustrate embodiments of the presently disclosed invention and, together with the description, disclose the principles of the invention.

FIG. 10 is a cross-sectional view of a seal of the present invention taken at 10-10 in FIG. 4.

FIG. 11 is a cross-sectional view of a seal of the present invention taken at 11-11 in FIG. 4.

FIG. 12 is a top view of a plate with attachment perforations indicated.

DETAILED DESCRIPTION OF THE INVENTION

Figure 1:
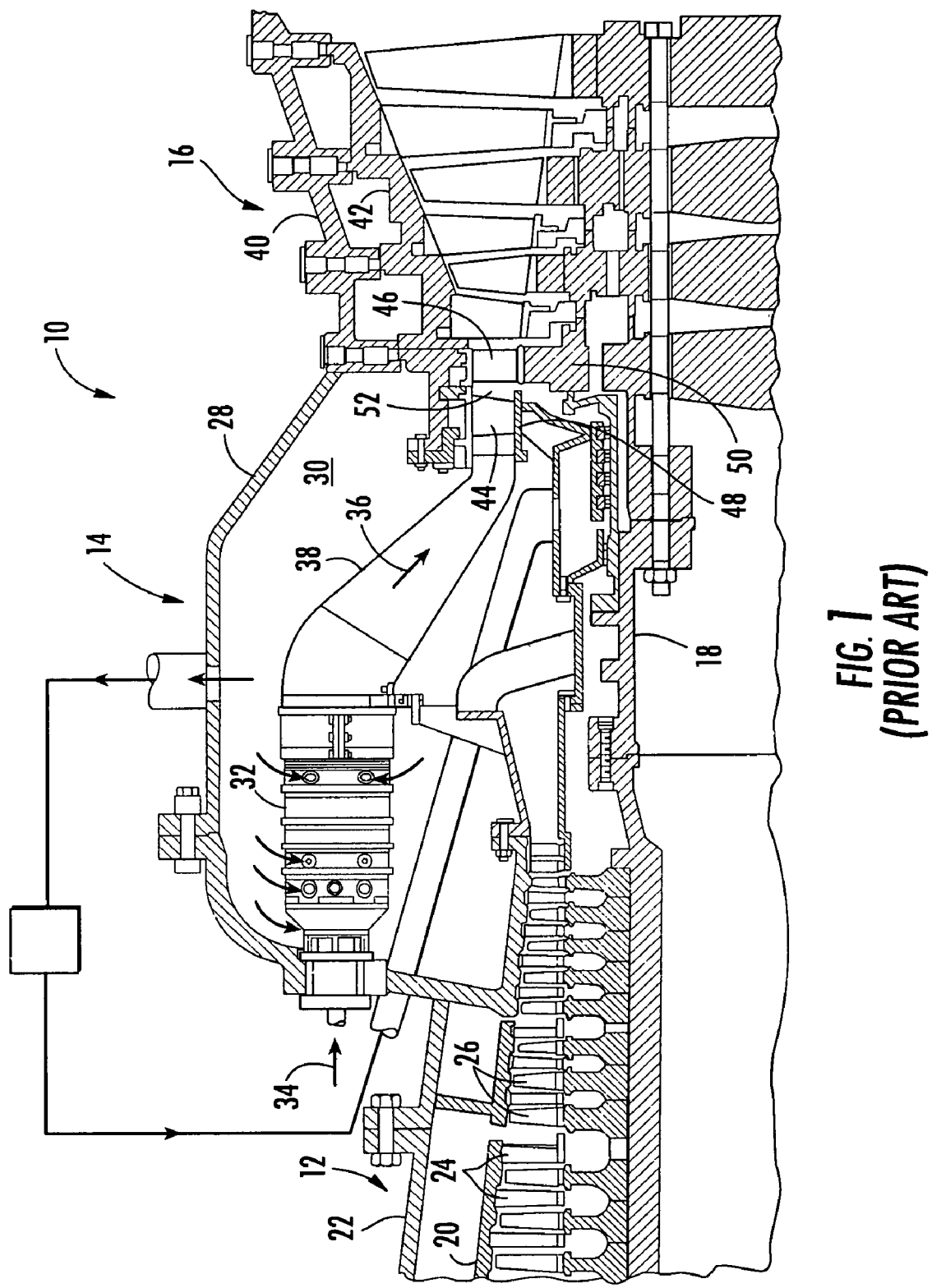
FIG. 1 is a cross-sectional view of a conventional turbine engine having can annular combustors.
Figure 2:
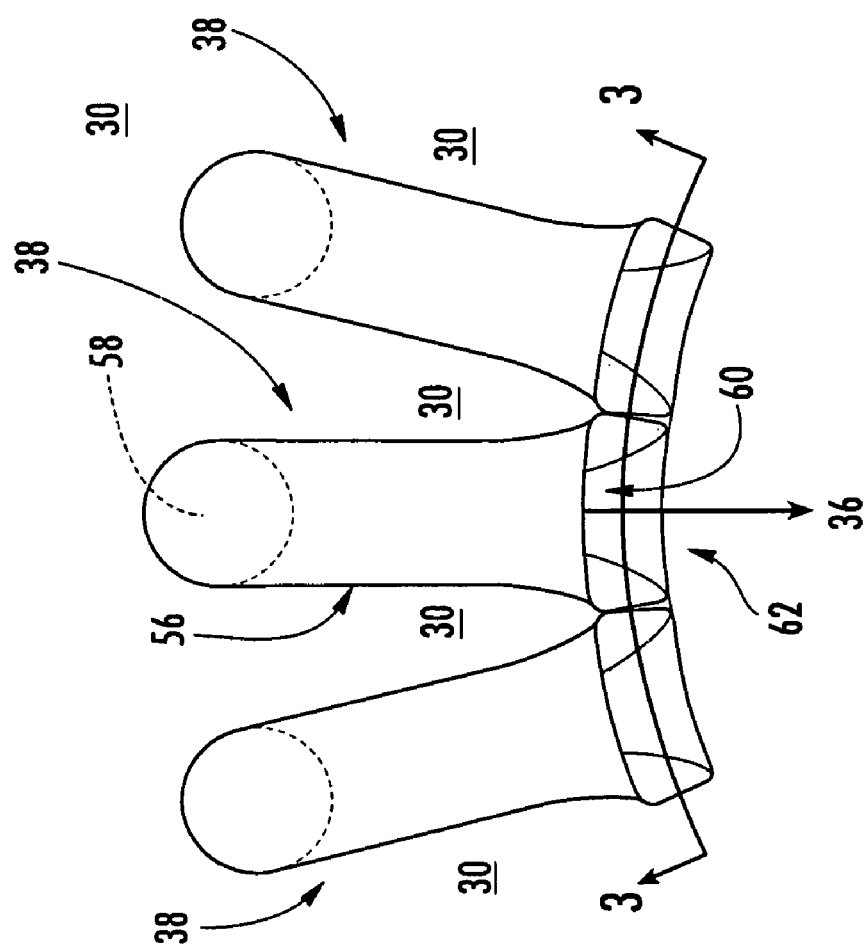
FIG. 2 is an axial view, from a downstream vantage point, of an array of adjacent transition sections for conveying combustor exhaust gas flow from the combustors into the turbine section of a conventional turbine engine.
Figure 3:
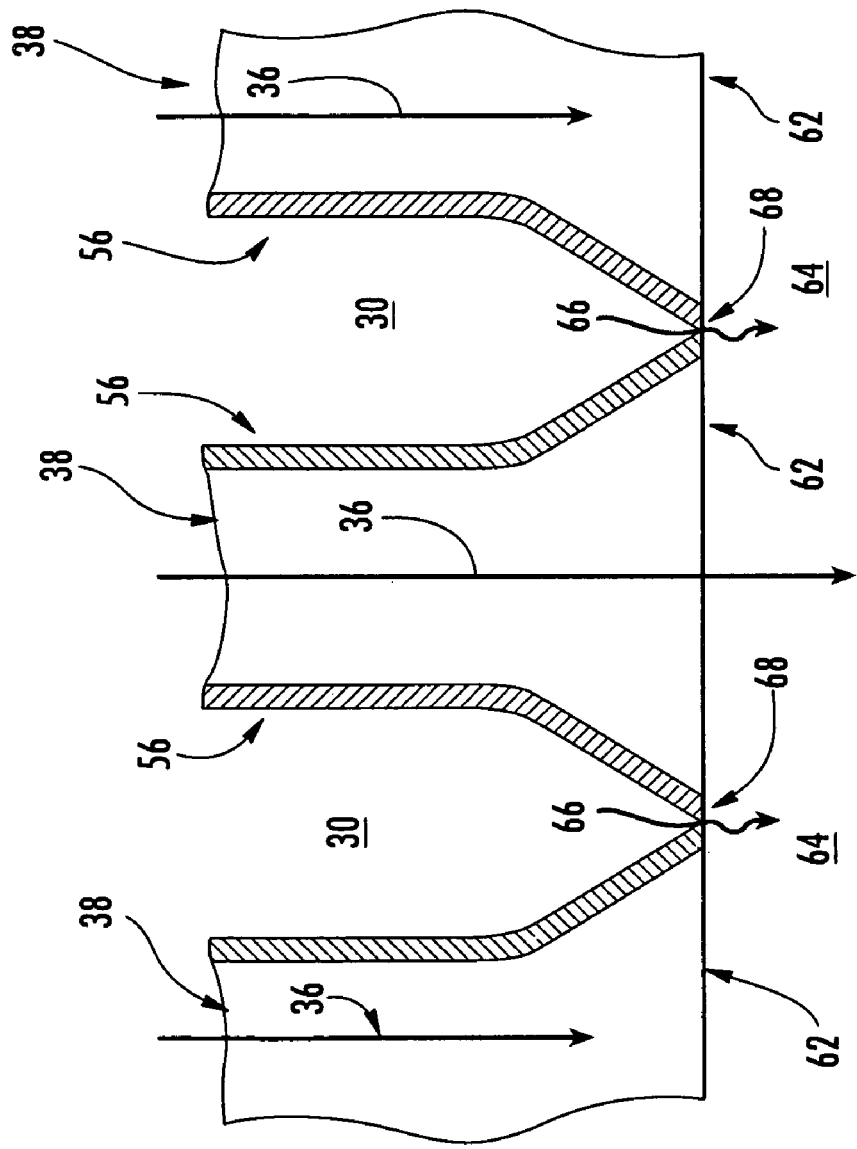
FIG. 3 is a cross-sectional view of the array of adjacent transition sections of the prior art taken at 3-3 in FIG. 2.

As shown in FIGS. 4-12, the present invention is directed to a seal 70 for sealing a gap 68 between transition sections 38 of adjacent can annular combustors in a turbine engine such that the seal 70 is usable in applications for sealing pressure drops of 0.5 bar or greater. The seal 70 may include a plate 72 configured to extend between adjacent transition sections 38. The plate may have one or more perforations 74 extending from a front surface 76 of the plate 72 to a rear surface 78 of the plate 72. The seal 70 may also include a porous matrix 80 formed from materials capable of withstanding turbine combustion gas temperatures. A portion of the porous matrix 80 may be fixedly attached to a surface 76, 77, 78 of the plate 72.

In another embodiment of the present invention, the seal 70 may be designed for pressure drops 0.5 bar or greater. Because the plate 72 may be designed to resist large amounts of pressure, the present seal 70 has great flexibility for sealing gaps with larger pressure drops. In one embodiment, the seal 70 may be modified to seal gaps 68 with a pressure drop of 1.0 bar or more across the gap 68. In another embodiment, the seal 70 may be modified to seal gaps 68 with a pressure drop of 3.0 bar or more across the gap 68. In yet another embodiment, the seal 70 may be modified to seal gaps 68 with a pressure drop of 5.0 bar or more across the gap 68.

Figure 4:
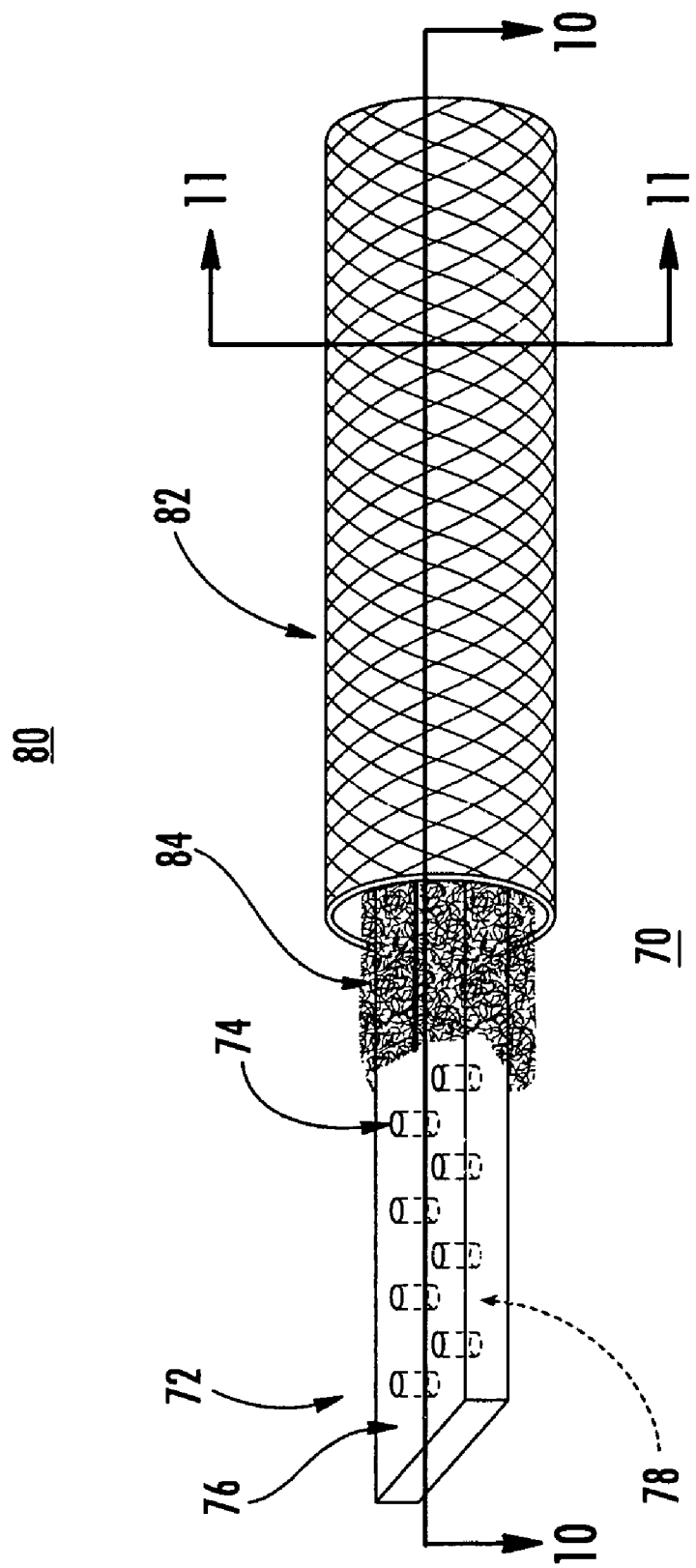
FIG. 4 is a perspective view of a seal of the present invention.

The seal 70, as shown in FIG. 4, may include a generally elongated plate 72 including at least one perforation 74 extending from a front surface 76 of the plate to a rear surface 78 of the plate. The seal may also include a porous matrix 80, a portion of which may be fixedly attached to a surface 76, 77, 78 of the plate 72.

As shown in FIG. 4, the plate 72 may be disposed within the porous matrix 80. In a specific embodiment, the porous matrix 80 may include a fibrous hose 82 and a fibrous packing material 84. The fibrous packing material 84 may be the portion of the porous matrix 80 fixedly attached to a surface, such as a front surface 76, of the plate 72. The plate 72 and the fibrous packing material 84 attached thereto may be disposed within the fibrous hose 82. As shown in FIG. 11, the plate 72 may be disposed within the fibrous packing material 84, and both the plate 72 and the fibrous packing material 84 disposed within the fibrous hose 82.

The fibrous packing material 84 may be formed from a matrix of metal fiber. In one embodiment, the fibrous packing material 84 may be fixedly attached to both the front surface 76 of the plate and the rear surface 78 of the plate.

The seal 70 may be designed to control flow of gases through the radially extending gap 68 between adjacent transition sections 38. This controlled flow may be used to cool both the transition section body 56 and the seal 70 itself. If there is no leakage, the flow profile within the compression chamber may tend to have slow moving air near the transition section outlets 62. The heat transfer rate may be reduced when the air flow slows down. Thus, cooling of the transition section body 56 may be limited if no controlled flow exists through the gap 68 between adjacent transition sections 38. Similarly, flow through the gap 68 may generally be desirable to help cool the seal 70 as flow through the perforations 74 may tend to provide convective cooling of the plate 72.

Another method of controlling flow through the gap includes modifying the porosity of the porous matrix 80. In one embodiment, the porosity of the porous matrix 80 may be modified by changing the thread count of the fibrous hose 82 or the fibrous packing material 84 density or fiber size.

Figure 5F:
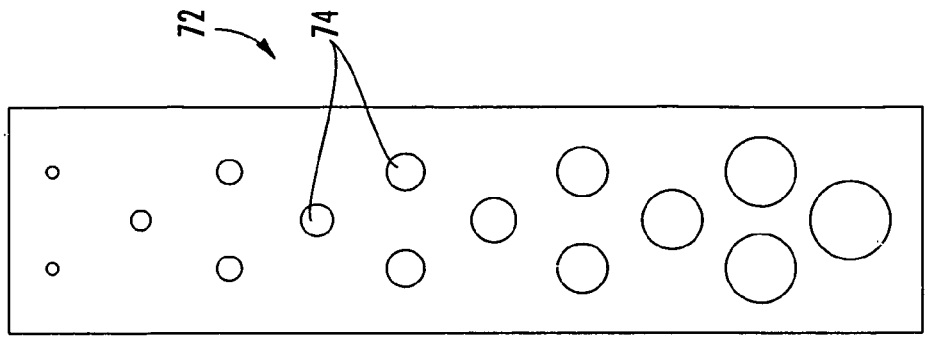
FIG. 5A-F are perspective views of plates of the present invention with different size perforations, different perforation densities and asymmetrical distributions of size and perforation density.
Figure 5E:
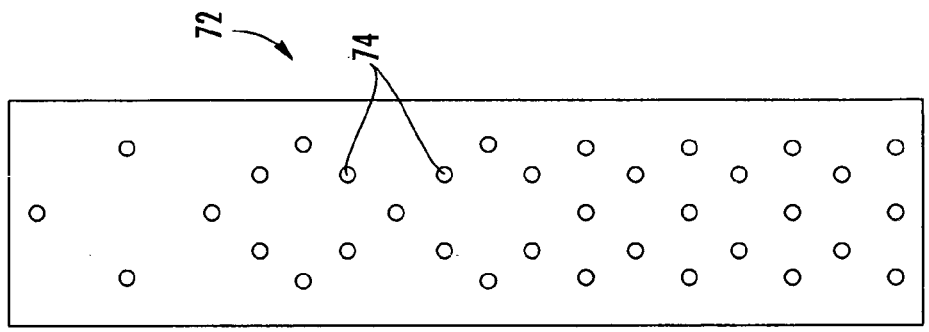
Figure 5C:
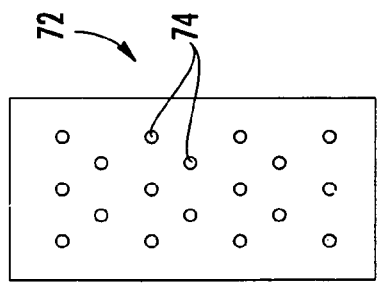
Figure 5D:
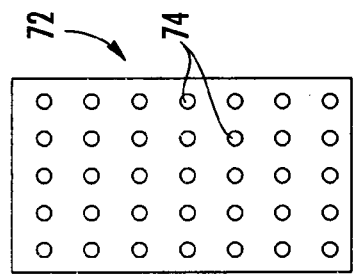
Figure 5A:
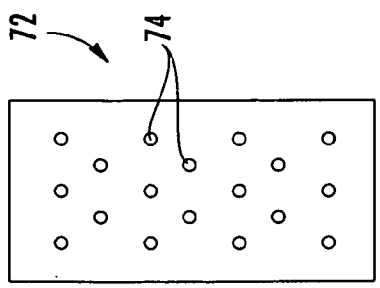
Figure 5B:
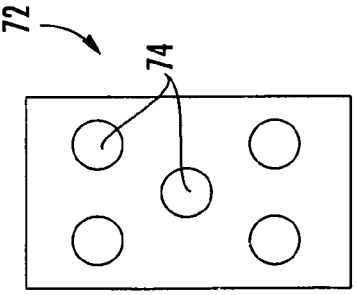

One method of controlling the amount of flow through a gap 68 sealed with the seal 70 is through modifications to the perforated plate 72. One variable for controlling flow may be the size of the perforation 74 or perforations 74 in the plate 72, as shown in FIGS. 5A, B & F. Another variable may be the percent of the front surface 76 or rear surface 78 of the plate 72 that is occupied by perforations. In general, when all other variables are held constant, the controlled flow through the seal 70 will generally increase as the size of the perforations 74 in the plate 72 increase (shown in FIGS. 5A & B) and as the percent of a surface 76, 78 of the plate 72 occupied by perforations 74 increases (shown in FIGS. 5C & D).

In one embodiment, the plate 72 may be modified to provide for variable amounts of flow through the seal 72 along the length of the radially extending gap 68 between adjacent transition sections 38. Such variability may be desirable because thermal gradients may exist along the length of the gap 68. Thus, it may be desirable to have more air flow through portions of the seal 70 exposed to higher temperatures than to those portions of the seal 70 exposed to lower temperatures. This could be achieved by having a gradually increasing perforation density, as shown in FIG. 5E, or perforations 74 having different cross-sectional areas, as shown in FIG. 5F, or a combination of both, traversing from one end of the plate 72 to the other. In one embodiment, one or more perforations 74 in the plate 72 may be generally circular and may have a diameter of at least about 5 mm. In another embodiment, the one or more perforations 74 in the plate 72 may be generally circular and have a diameter of at least about 1 cm. the perforations 74 may have any appropriate shape such as, but not limited to, circular, oval, triangular, rectangular, and others.

In another embodiment, the perforations 74 may occupy between about 30 percent and about 60 percent of the surface area of the front surface 76. In another embodiment, the perforations 74 may occupy between about 25 percent and about 35 percent of the surface area of the front surface 76. In another embodiment, the seal 70 may have a plurality of perforations 74 in the plate 72 and the perforations are distributed asymmetrically in the plate 72, as shown in FIGS. 5E and 5F).

The plate 72 may be formed from a material such as, but not limited to a metal, a ceramic and other materials. In another embodiment, the plate 72 may be formed from a metal that is a nickel-based alloy, an iron-based alloy, a cobalt-based alloy, or other materials. The porous matrix 80 may be formed from a ceramic, a metal, or other appropriate materials.

Figure 6B:
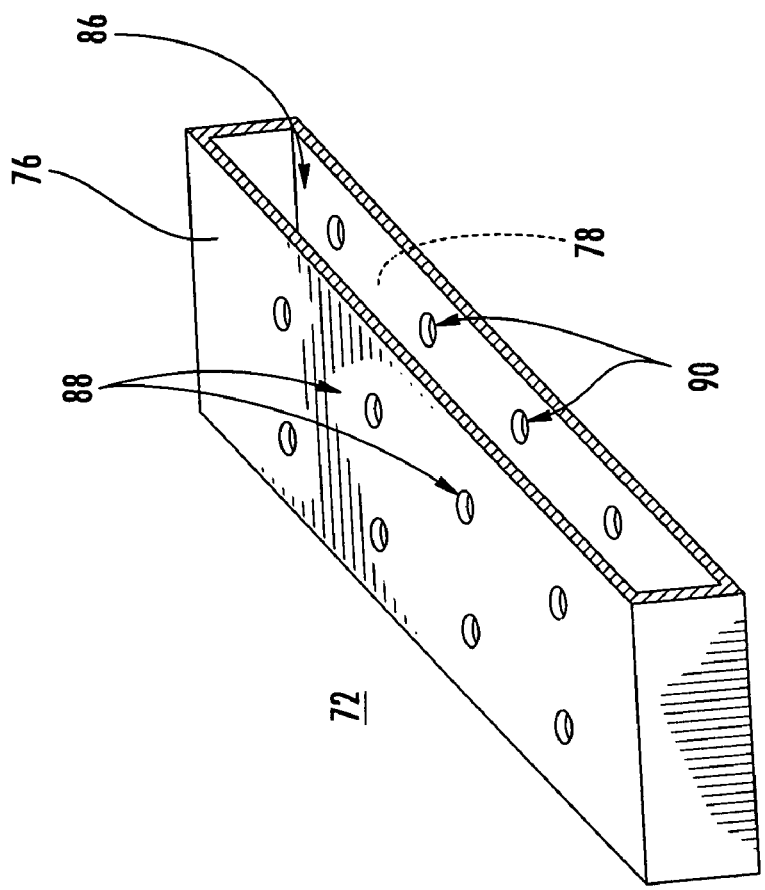
FIG. 6B is a cross-section of a plate taken along line 6B-6B in FIG. 6A.
Figure 6A:
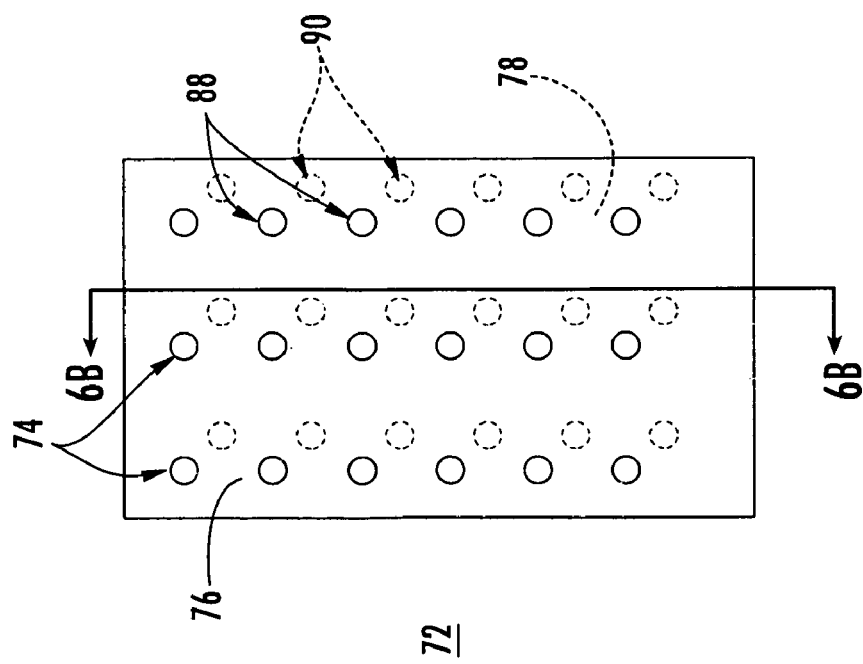
FIG. 6A is a top view of a plate with an internal chamber where the plate has front surface perforation openings that are offset from rear surface perforation openings.

In one embodiment, as shown in FIG. 6, the plate 72 may include one or more internal chambers 86. The plate 72 may include a plurality of perforations 74 positioned such that the front surface perforation openings 88 are offset from the rear surface perforation openings 90. Such an embodiment may be useful to prevent overheating of the seal 70. In addition to the convection cooling that occurs when air passes through perforations 74 in a solid plate 72, this offset orientation also provides impingement cooling of the plate 72.

Figure 7B:
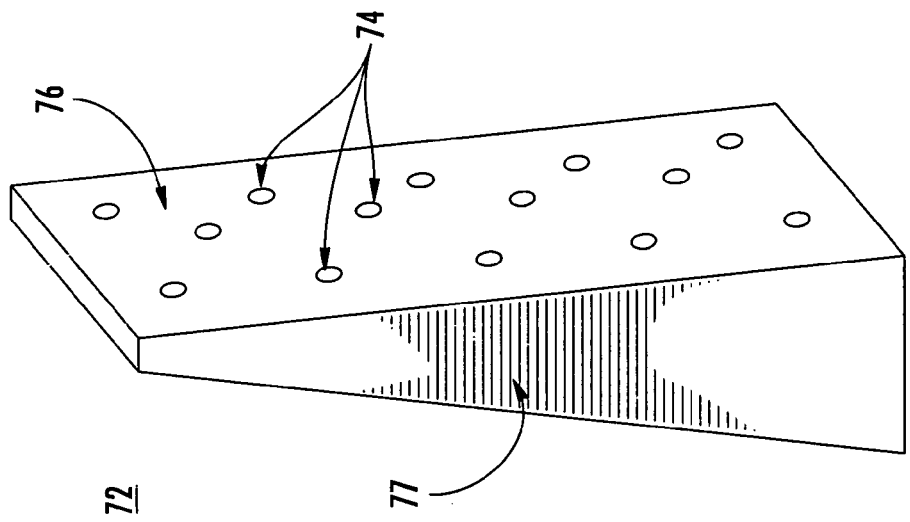
FIG. 7B is a perspective left side view of a plate with an asymmetrically shaped surface.
Figure 7A:
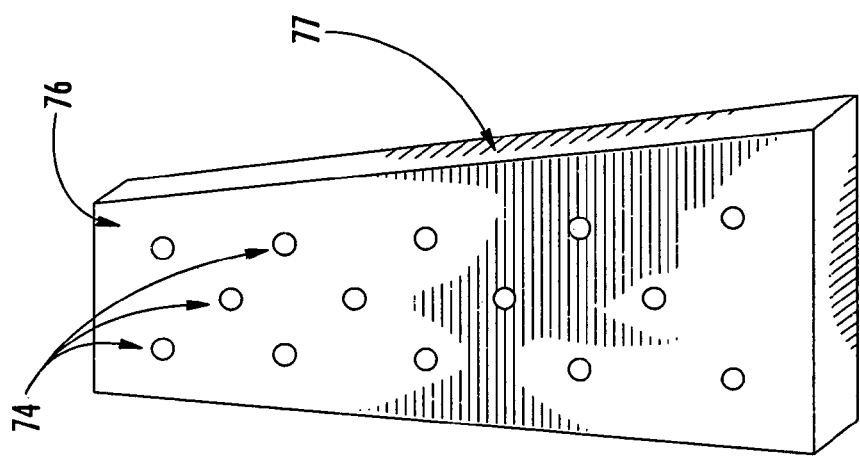
FIG. 7A is a perspective view of a plate with an asymmetrically shaped surface.

In another embodiment, as shown in FIGS. 7A and 7B, a surface 76, 77, 78 of the plate 72 may be asymmetrically shaped. For instance, in order to account for thermal distortion, the front surface 76 of the plate 72 may be narrower at an end exposed to higher temperatures that an end exposed to lower temperatures, as shown in FIG. 7A. Similarly, the side surface 77 of the plate 72 may be thinner at an end exposed to higher temperatures and wider at an end exposed to lower temperatures, as shown in FIG. 7B. The asymmetric shape may also be used to otherwise improve the fit of the seal 72 within the seal housing 96.

The front surface 76 and rear surface 78 of the plate 72 may be larger than side surfaces 77 of the plate 72 and may be configured to be received within radially extending channels 92 in transition sections 38 of a turbine engine.

Figure 8B:
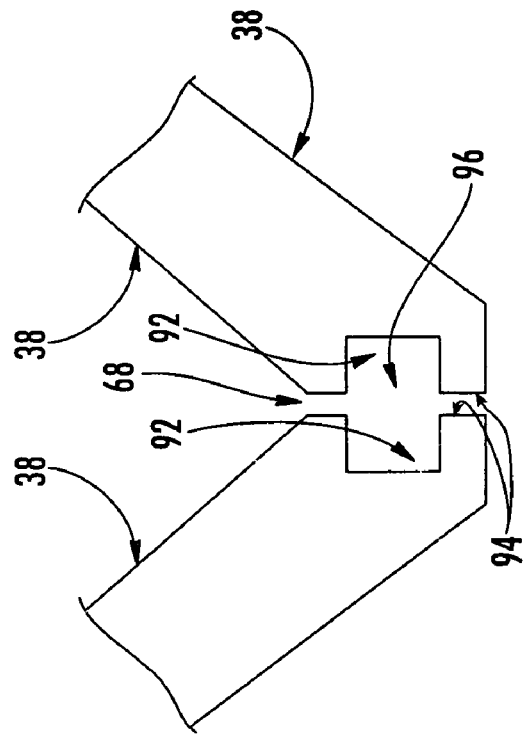
FIG. 8B is a top, detail view of the gap take at line 8B-8B in FIG. 8A.
Figure 8A:
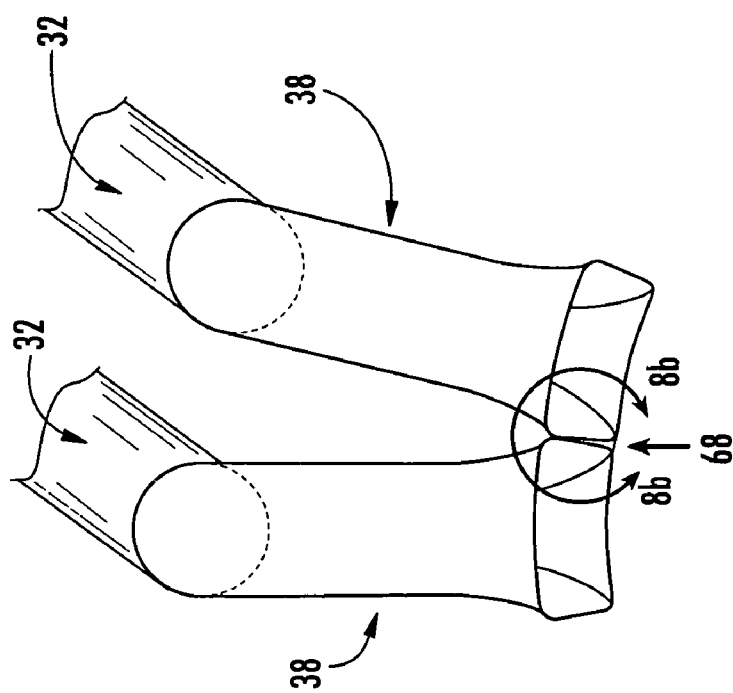
FIG. 8A is a perspective view of a radially extending gap between adjacent transition sections and a radially-oriented seal housing of the present invention without the seal therein.

As shown in FIG. 8A, another embodiment is a combustion turbine 10 that includes a plurality of adjacent can annular combustors 32 extending generally axially, whereby each can annular combustor 32 has a transition section 38. The can annular combustors 32 and transition sections 38 may be positioned such that a portion of each transition section 38 is positioned proximate to an adjacent transition section 38 creating radially extending gaps 68. At least one pair of the transition sections 38 each includes a radially extending channel 92 in a side surface 94 defining a portion of the radially extending gap 68 between two transition sections 38. The channels 92 in adjacent transition sections 38 are generally aligned to create a radially-oriented seal housing 96. As shown in FIG. 4, the combustion turbine 10 may also include a seal 70 composed of a plate 72 configured to extend between adjacent transition sections 38 and a porous matrix 80 formed from materials capable of withstanding turbine combustion gas temperatures. A portion of the porous matrix 80 may be fixedly attached to a surface 76, 77, 78 of the plate 72. The plate 72 may have one or more perforations 74 extending from a front surface 76 of the plate 72 to a rear surface 78 of the plate 72.

A portion of the porous matrix 80 may be attached to the plate 72 through methods such as may be useful include, but are not limited to, seam welding, braising, spot welding, and mechanical attachment, such as riveting a rivet or threading a wire through the portion of the porous matrix 80 and an attachment perforation 106 in the plate 72. As shown in FIG. 12, the plate 72 may include perforations 74 designated as attachment perforations 106 that may be used to attach a portion of the porous matrix 80 to the plate 72 using mechanical attachment means.

Figure 9:
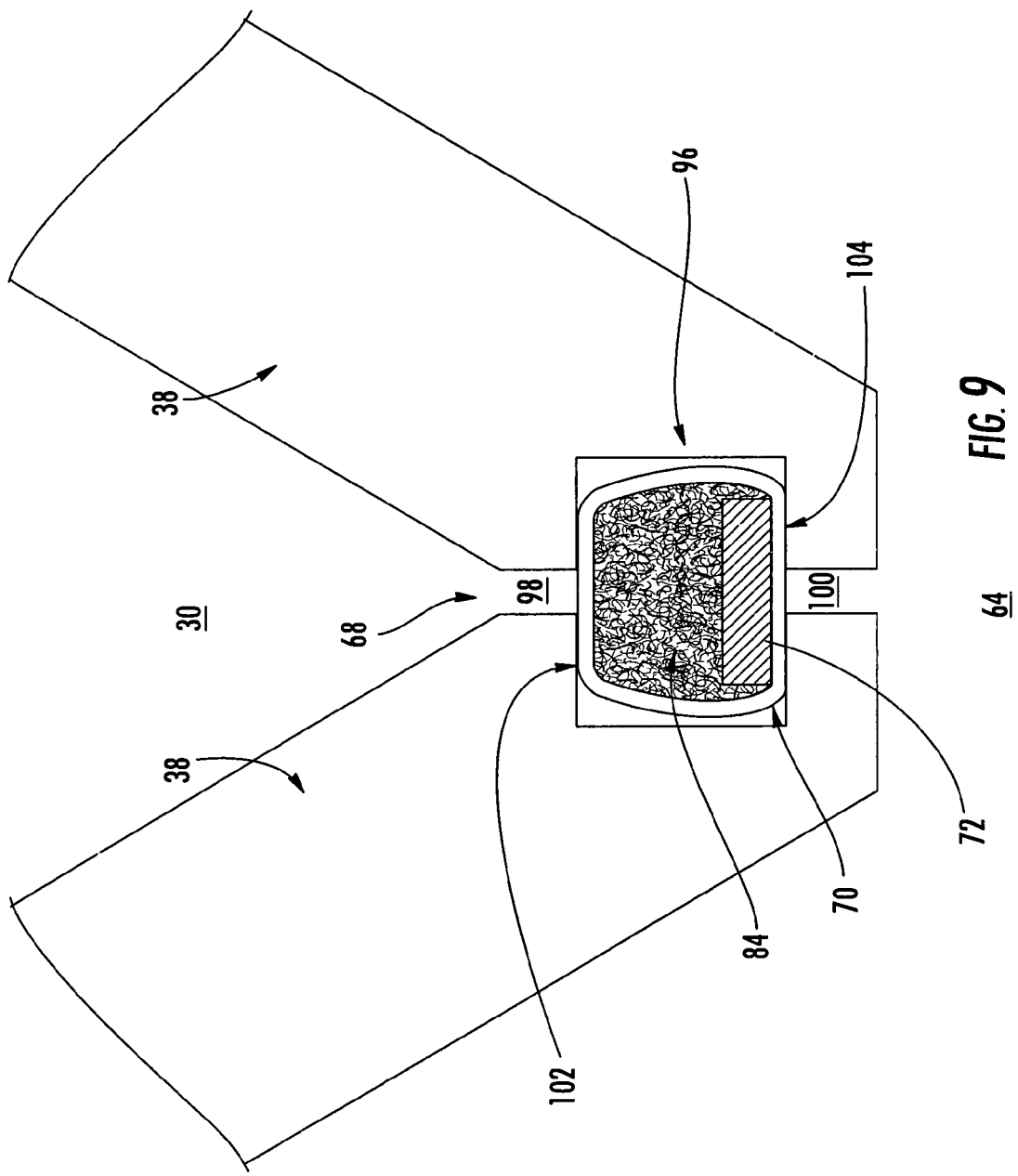
FIG. 9 is a detail view of a seal of the present invention located inside a radially-oriented seal housing at line 8B-8B in FIG. 8A.

As shown in FIG. 9, the seal housing 96 may include a high pressure side 98 and a lower pressure side 100. The seal 70 may be oriented such that the perforated plate 72 is positioned proximate to the lower pressure side 100 of the seal housing 96. The porous matrix 80 portion of the seal 70 may be positioned adjacent to the high pressure side 98 of the seal housing 96.

The porous matrix 80 may contact a sidewall 102 of the seal housing 96 and bias the seal 70 toward an opposing sidewall 104 of the seal housing 96. Similarly, the porous matrix 80 may contact the valley of one radially extending channel 92 forming the seal housing 96 and bias the seal 70 toward the valley of the other radially extending channel 92 forming the seal housing 96. This biasing property may help to minimize leakage 66 and reduce wear on both the seal 70 and the transition sections 38. In one example, the fibrous packing material 84 may be disposed within the fibrous hose 82 such that the seal 70 is resilient. The seal 70 may be so resilient that when placed within the seal housing 96 the seal 70 exerts a force against the sidewalls 102, 104 sufficient to lock the seal within the channels 92 forming the radially-oriented seal housing 96.

The turbine engine 10 directs gases into the compression chamber 30. A portion of the compression chamber is defined by the plurality of transitions sections 38. Because gaps 68 may exist between adjacent transition sections 38, the gases in the compression chamber 30 may leak through the gap 68 from the high pressure side of the seal housing 98 to the low pressure side of the seal housing 100 and into the turbine section 16.

During use, the seal 70 limits the amount of gas that leaks from the compression chamber 30 to the turbine section 16 through the gap 68. The seal may control such leakage because of the size and arrangement of perforations 74 in the plate 72 and the porosity of the elements of the porous matrix 80, for instance the thread count of the fibrous hose 82 or the density of the fibrous packing matrix 84. Unlike prior seals, the present seals 70 may be highly durable and effective within the space limitations of the present application. In addition, the present seals may also be designed to limit substantially all leakage 66 through the gap 68, except for an amount that may be necessary for convective cooling of the plate 72 itself.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A seal for sealing a gap between transition sections of adjacent can annular combustors in a turbine engine such that the seal is usable in applications for sealing pressure drops of 0.5 bar or greater, comprising:
   a plate configured to extend between adjacent transition sections, wherein the plate has at least one perforation extending from a front surface of the plate to a rear surface of the plate;
   a porous matrix formed from materials capable of withstanding turbine combustion gas temperatures, wherein a portion of the porous matrix is fixedly attached to a surface of the plate; and
   wherein the porous matrix comprises a fibrous hose and a fibrous packing material, wherein the fibrous packing material comprises the portion of the porous matrix fixedly attached to a surface of the plate and wherein the plate and the fibrous packing material attached thereto are disposed within the fibrous hose.

2. The seal of claim 1, wherein the at least one perforation in the plate is generally circular and has a diameter of at least about 1 cm.

3. The seal of claim 1, wherein the at least one perforation comprises between about 30 percent and about 60 percent of surface area of the front surface.

4. The seal of claim 1, wherein the at least one perforation on the plate comprises a plurality of perforations and wherein the perforations are distributed asymmetrically in the plate.

5. The seal of claim 1, wherein a surface of the plate is asymmetrically shaped.

6. The seal of claim 1, wherein the plate is disposed within the porous matrix.

7. The seal of claim 1, wherein the front and rear surfaces of the plate are each larger than side surfaces of the plate and are configured to be received within channels in side surfaces of transition sections of a turbine engine.

8. The seal of claim 1, wherein the plate is formed from a material selected from the group consisting of a metal and a ceramic.

9. The seal of claim 8, wherein the plate is formed from a metal, and the metal is selected from the group consisting of a Nickel-based alloy, an Iron-based alloy, a Cobalt-based alloy, an a combination thereof.

10. The seal of claim 1, wherein the plate includes at least one internal chamber.

11. The seal of claim 10, wherein the at least one perforation comprises a plurality of perforations positioned such that perforation opening in the front surface are offset from perforation openings in the rear surface.

12. The seal of claim 1, wherein the porous matrix comprises a material selected from the group consisting of ceramics and metals.

13. The seal of claim 1, wherein the fibrous packing material comprises a matrix of metal fiber.

14. The seal of claim 1, wherein the plate is disposed within the fibrous packing material.

15. A turbine engine, comprising:
    a plurality of adjacent can annular combustors extending generally axially and each having a transition section, wherein a portion of the transition sections are positioned proximate to each other creating radially extending gaps;
    wherein at least one pair of transition sections each includes a radially extending channel in a side surface defining a portion of the radially extending gap between two transition sections;
    wherein the channels in the transition sections are generally aligned to create a radially-oriented seal housing; and
    a seal comprising a plate configured to extend between adjacent transition sections, wherein the plate has at least one perforation extending from a front surface of the plate to a rear surface of the plate, and a porous matrix formed from materials ca able of withstanding turbine combustion gas temperatures, wherein a portion of the porous matrix is fixedly attached to a surface of the plate, wherein the porous matrix comprises a fibrous hose and a fibrous packing material, wherein the fibrous packing material comprises the portion of the porous matrix fixedly attached to a surface of the plate and wherein the plate and the fibrous packing material attached thereto are disposed within the fibrous hose.

16. The turbine engine of claim 15, wherein said seal housing has a high pressure side and a relatively lower pressure side and wherein the seal is oriented such that the perforated plate is adjacent to the relatively lower pressure side of the seal housing and a porous matrix portion of the seal is adjacent to the high pressure side of the seal housing.

17. The turbine engine of claim 15, wherein the porous matrix contacts a sidewall of the channel forming the seal housing and biases the perforated plate toward an opposing sidewall of the seal housing.

18. The turbine engine of claim 15, wherein the plate includes at least one internal chamber.

* * * * *